United States Patent
Leser et al.

[11] Patent Number: 6,030,467
[45] Date of Patent: Feb. 29, 2000

[54] SURFACTANT-AIDED REMOVAL OF ORGANICS

[75] Inventors: Ernst G. Leser, Elkton, Md.; James Allan Wingrave, Chadds Ford, Pa.

[73] Assignee: E. I. du Pont de Nemours and Company, Wilmington, Del.

[21] Appl. No.: 08/115,274

[22] Filed: Aug. 31, 1993

[51] Int. Cl.[7] .............................. B08B 7/00; C09K 17/00; A62D 3/00

[52] U.S. Cl. .......................... 134/40; 405/263; 588/205; 210/908; 210/925; 134/42

[58] Field of Search .................................. 588/205, 206, 588/249; 134/40, 42; 210/908, 912, 922, 925; 405/263

[56] References Cited

U.S. PATENT DOCUMENTS

| | | | |
|---|---|---|---|
| 2,748,080 | 5/1956 | Newcombe et al. | 252/8.55 |
| 2,882,973 | 4/1959 | Doscher et al. | 166/42 |
| 3,375,872 | 4/1968 | McLaughlin et al. | 166/29 |
| 3,770,423 | 11/1973 | Lores et al. | 75/108 |
| 3,877,887 | 4/1975 | Moore et al. | 48/1 |
| 4,422,940 | 12/1983 | Cousino et al. | 210/631 |
| 4,732,213 | 3/1988 | Bennett et al. | 166/292 |
| 4,783,263 | 11/1988 | Trost et al. | 210/908 |
| 5,055,196 | 10/1991 | Darian et al. | 210/638 |
| 5,120,428 | 6/1992 | Ikura et al. | 208/188 |
| 5,122,294 | 6/1992 | Miller et al. | 134/29 |
| 5,181,796 | 1/1993 | DeYoung | 405/128 |
| 5,232,596 | 8/1993 | Castaldi | 210/603 |
| 5,252,138 | 10/1993 | Guymon | 210/922 |
| 5,266,494 | 11/1993 | Lahoda et al. | 134/10 |
| 5,302,287 | 4/1994 | Losack | 210/912 |
| 5,302,320 | 4/1994 | Hosmer et al. | 210/525 |

OTHER PUBLICATIONS

Paul Becher, Emulsions: Theory and Practice, Second Edition, Reinhold Publishing Corp. 209–266, 1965.
William C. Griffin, Calculation of HLB Values of Non–Ionic Surfactants, Atlas Powder Company, 249–256.
Handbook on In Situ Treatment of Hazardous Waste–Contaminated Soils, *EPA* Jan. 1990.
Paul Becher, Emulsions: Theory and Practice, Second Edition, Robert E. Krieger Publishing Company, 1977.
James H. Nash, Field Studies of In Situ Soil Washing, *EPA*, Feb. 1988.
Milton J. Rosen, Surfactants and Interfacial Phenomena, A *Wiley–Interscience Publication*, 1978.
Milton J. Rosen, Surfactants and Interfacial Phenomena, A *Wiley–Interscience Pub.*, Second Edition, 1989.

*Primary Examiner*—Gary P. Straub

[57] ABSTRACT

The present invention relates to a surfactant solution, and to using an aqueous solution of the surfactants, optionally with an antifoaming additive, for removing or washing MFAC contaminants from equipment, sludge, scale, and soil, among others. Examples of MFAC and related contaminants that can be removed by practicing the invention include at least a member of the tetraalkylleads, including but not limited too, tetramethyllead, trimethylethyllead, dimethyldiethyllead, methyltriethyllead, and tetraethyllead. While any suitable surfactant can be used for practicing the invention, an aqueous solution containing at least one member from the group of nonionic alcohol ethoxylates, including but not limited to the polyethoxylated aliphatic alcohols, is particularly effective at removing MFAC contaminants.

14 Claims, 2 Drawing Sheets

FIG. 1

SURFACTANT-AIDED REMOVAL OF ORGANICS

FIELD OF THE INVENTION

The present invention relates to a procedure for using an aqueous surfactant system to remove alkyllead compounds and solvents associated with motor fuel antiknock compound (hereinafter referred to as "MFAC"), such as 1,2-dichloroethane and 1,2-dibromoethane, from equipment, sludges, soils, among others.

BACKGROUND OF THE INVENTION

MFACs were widely used; but are now being phased out because of concerns over contamination of the environment with lead compounds, and incompatibility of MFAC-treated fuels with catalytic devices used to minimize motor exhaust emissions of hydrocarbons, carbon monoxide, and oxides of nitrogen. Manufacturing and distribution equipment worldwide is frequently contaminated with components of MFACs. Contaminated sludges typically also exist in this equipment. In many cases soils at MFAC and petroleum refinery manufacturing and storage sites, as well as commercial gasoline storage areas, have been contaminated with these same MFAC components. The primary MFAC components of concern comprise at least one tetraalkyllead ingredient, (e.g., tetraethyllead, TEL, and/or tetramethyllead, TML, and solvents and scavengers such as 1,2-dichloroethane (ethylene dichloride, EDC), 1,2- dibromoethane (ethylene dibromide, EDB), among others. These components of MFAC are toxic and, thus, treatment of contaminated equipment, sludges, and soils is usually required prior to their disposal or reclamation.

While several alkylleads have been used, by far the most prevalent one is TEL, tetraethyllead. TEL is not stored or sold as a pure chemical due to its thermal and storage instability. The EDC and/or EDB serve as stabilizers in storage and as lead scavengers when the TEL breaks down in the internal combustion engine. The MFAC can be used to raise the octane value of motor gasoline to prevent knocking. MFAC is manufactured in two grades, TEL Motor Antiknock and TEL Aviation Antiknock. Commercially available TEL Motor Antiknock is a mixture of TEL (61.5% by wt.) in ethylene dichloride (18.8%), ethylene dibromide (17.9%), and kerosene (1.8%). Commercially available TEL Aviation Antiknock is a mixture of TEL (61.5%), EDB (35.7%), and kerosene (2.8%), and can be used in aviation gasoline for piston engine aircraft.

MFAC can be transported to refineries by rail tank cars, tank trucks, and by ship worldwide. Spills may occur at the various terminals and storage facilities thereby creating MFAC-contaminated soil.

MFAC can be unloaded into weigh tanks at the refinery. MFAC can be metered from these tanks into the gasoline to make "leaded" gasoline. TEL slowly decomposes to lead oxides, lead bromides, and lead hydroxybromides in these weigh tanks. Corrosion of the interior tank surfaces normally forms an iron oxide deposit or scale, e.g., lead and iron salts, within the tank. This scale comprises a dense, heterogeneous material with TEL, EDC, and EDB adsorbed onto the deposit or scale.

TEL contaminated sludge (and soil contaminated with TEL) arises at the alkyllead manufacturing facility. The wash water waste stream from the TEL manufacturing process contains fine particulate lead. This water stream is typically fed to a settling basin to allow the solids to settle prior to the water being discharged. Due to the insolubility of TEL in water (0.8 ppm), it is found adhered to this sludge deposited in the settling ponds. Air oxidation of the fine lead affords lead oxide, which under the alkaline conditions of the waste stream readily combines with carbon dioxide to form basic lead carbonate [$2PbCO_3 \cdot Pb(OH)_2$], the predominant inorganic constituent of the sludge. The basic lead carbonate typically is contaminated with significant quantities of adsorbed TEL.

Various treatment methods are known or have been proposed for treating contaminated environments. The use of surfactants, including nonionic surfactants, in aqueous solution to emulsify oily contaminants is well known For instance, Newcombe and Doane in U.S. Pat. No. 2,748,080 and Doscher and Reisberg in U.S. Pat. No. 2,882,973 disclose such techniques for recovering oil from tar sands.

It is also known that hydrophobic contaminants can be removed from surfaces with aqueous surfactants to effect decontamination using co-solvents or modifiers such as kerosene. One example is disclosed by U.S. Pat. No. 4,783,263 wherein procedures for using flotation cells and modifiers in order to remove a range of contaminants, including tetraethyllead.

Other examples of known procedures are disclosed in U.S. Pat. Nos. 5,055,196 and 5,122,194 that relate to processes for removing polychlorinated biphenyls (PCBs) by treating soils and sludges with a solvent, such as hexane or kerosene, and an aqueous surfactant solution.

In a different area of technology, Ikura et al. in U.S. Pat. No. 5,120,428 disclose methods for selecting surfactants for processes to deash (remove mineral or ash constituents) heavy hydrocarbon residues, such as those resulting from coal liquefaction. Ikura et al. select surfactants with hydrophile-lipophile balance values (HLB) between 1 and 6 for creating a water-in-oil emulsion and a surfactant with HLB values higher than 15 to render the dispersed ash more hydrophilic, concentrating the undesired ash from the oil phase to the water phase for disposal.

M. J. Rosen, Surfactants and Interfacial Phenomena, 2nd Ed., John Wiley & Sons, (1989) discloses techniques to select surfactants based on HLB values.

Another conventional method relates to soil flushing, and has been reviewed by the U.S. Environmental Protection Agency (EPA). In the Agency's Handbook on In Situ Treatment of Hazardous Waste-Contaminated Soils [EPA/540/2–90/001, January 1990], flushing with aqueous surfactant solutions, including nonionic surfactants, is discussed in Section 3.

The disclosure of each of the above-identified patents and references is hereby incorporated by reference.

SUMMARY OF THE INVENTION

The present invention relates to surfactant solutions, and to using aqueous solutions of the surfactants, optionally with an antifoaming additive, for removing or washing MFAC contaminants from equipment, scale, sludge, soil, among others. By "equipment" is meant MFAC storage tanks, and all process and transportation facilities, together with all associated piping, control devices and instrumentation, among others that has been subjected to MFAC contamination. By "scale" is meant solid deposits of iron and lead salts. By "sludge" is meant an aqueous slurry or mud containing iron and lead salts, typically in a finely divided state. "Soil" is intended to refer to any contaminated ground surface. The invention also relates to recovery or disposal of the removed contaminants by known treatments processes, e.g., conventional wastewater treatment processes.

Examples of MFAC and related contaminants that can be removed by practicing the invention include at least a member of the tetraalkylleads such as tetramethyllead, trimethylethyllead, dimethyldiethyllead, methyltriethyllead, tetraethyllead, and bromoethanes such as 1,2-dibromoethane, among others. While any suitable surfactant can be used for practicing the invention, an aqueous solution containing at least one member from the group of nonionic alcohol ethoxylates such a polyethoxylated aliphatic alcohol, are particularly effective at removing MFACs contaminants. Normally, the surfactant is characterized by a HLB value that ranges from about 12 to about 13.5, and usually 12 to 13.

The invention overcomes problems associated with conventional methods by reducing, if not eliminating, the usage of flotations cells, and solvents. The effectiveness of the process in removing MFAC components, as shown in the accompanying examples, can be greater than 90%.

DETAILED DESCRIPTION

Broadly, the process of the present invention comprises decontaminating and removing MFACs from scale, equipment, sludges, or soils by using the following four steps:

1. Determining the hydrophile-lipophile balance (hereinafter referred to as "HLB") value for the contaminant, 2. Selecting at least one surfactant having an HLB value similar to the HLB value of the MFAC contaminant, e.g., within about 1.0 and normally 0.5 HLB units, 3. Flushing contaminated equipment, sludge, soil among others with an aqueous solution of the surfactant or mixture of surfactants in a manner that creates a MFAC/surfactant emulsion, and 4. Disposing of a wash solution that contains an emulsified contaminant.

The surfactants of the invention can be employed by using in situ, simulated in situ, and ex situ methods. By "in situ" methods, it is meant that the MFAC is removed from the contaminated material without substantially disturbing or removing the material from the contaminated area. One example of an in situ method comprises using an injection well to introduce the surfactant into a contaminated geologic structure at a first location, and wherein emulsified MFAC is removed at a second location, e.g., by pumping water from a second extraction well. Another example of an in situ method is described in copending and commonly assigned U.S. patent application Ser. No. 08/060/387 filed on May 11, 1993 to Noll et al.; the subject matter of which is hereby incorporated by reference.

By "simulated in situ" methods, it is meant that the contaminated material is removed from its initial location before the MFAC is removed. One example of a simulated in situ method comprises excavating or removing MFAC contaminated soil, placing the soil into a defined area or housing, and removing the MFAC substantially without further disturbing the soil. In some cases, a simulated in situ method can be practiced by loading the contaminated material into a container and passing the surfactant, optionally under pressure, through the container, e.g., using gravity to transport the surfactant through the contaminated material.

By "ex situ" method, it is meant that the contaminated material is removed, e.g., pumped, excavated, or otherwise separated from its initial location and a shear force is applied to the material while in contact with the surfactant. For example, contaminated material comprising at least one of soil, sludge, scale, among others, is transported to a container or vessel having a means of agitation, e.g., stirrer, auger, agitation by gas bubbling, fluidized bed, among others, so that the contaminated material is agitated while being contacted with a surfactant.

The HLB value of the MFAC to be removed, for example, tetraethyllead (TEL) can be determined by combining various surfactants that have a range of known HLB values with tetraethyllead and water. The MFAC will form a stable emulsion with the surfactant that has a similar HLB value. By determining whether or not a stable emulsion was formed between MFAC and surfactants having a range of known HLB values, the HLB value of the MFAC can be bracketed. Examples of suitable test surfactants with known HLB values can be obtained from handbooks of chemical properties or textbooks on detergents and emulsion such as W. C. Griffin in J. Society of Cosmetic Chemists, Vol. 5, #4, December 1954 and Emulsions: Theory and Practice, by P. Becher (Reinhold, 1966); hereby incorporated by reference. While any suitable surfactant can be employed for determining the HLB value and practicing the invention, for best results, the suitable surfactant substantially avoids causing water to become emulsified into the MFAC. In other words, it is beneficial to employ a surfactant that causes the MFAC to become emulsified into water.

Suitable surfactants for determining the HLB values for a MFAC contaminate, and the HLB values of such surfactants are listed in Table 1.

TABLE 1

| SURFACTANTS FOR MEASURING THE HLB VALUE OF TETRAETHYLLEAD | | | |
|---|---|---|---|
| Surfactant | Supplier | HLB value | Description |
| SPAN 20 (TM) | Sigma Chemical Co. | 8.6 | Sorbitan monolaurate |
| SPAN 40 (TM) | Sigma Chemical Co. | 6.7 | Sorbitan Monopalmitate |
| SPAN 80 (TM) | Sigma Chemical Co. | 4.3 | Sorbitan monooleate |

TABLE 1-continued

SURFACTANTS FOR MEASURING THE HLB
VALUE OF TETRAETHYLLEAD

| Surfactant | Supplier | HLB value | Description |
|---|---|---|---|
| SPAN 85 (TM) | Sigma Chemical Co. | 1.8 | Sorbitan trioleate |
| TWEEN 85 (TM) | ICI PLC. | 11.0 | 20 EO Sorbitan trioleate |
| TWEEN 21 (TM) | ICI PLC. | 13.3 | 4 EO Sorbitan monolaurate |
| TWEEN 20 (TM) | ICI PLC. | 16.7 | 20 EO Sorbitan monolaurate |

Each of the above-identified surfactants were used to determine the HLB value of tetraethyllead by placing each surfactant into a vial along with approximately 2.5 ml of deionized water and 2.5 ml of tetraethyllead. The quantity of surfactant and stability of the emulsion formed is indicated in Table 2.

TABLE 2

PRELIMINARY SCREENING FOR DETERMINING THE HLB
VALUE OF TETRAETHYLLEAD

| Vial | TWEEN 85 (TM) | TWEEN 21 (TM) | SPAN 20 (TM) | Surfactant HLB | Observation after 40 hr. |
|---|---|---|---|---|---|
| 1 | 1.0 | 1.5 | 0.0 | 12.4 | TEL emulsified into water |
| 2 | 0.8 | 1.2 | 0.5 | 11.6 | Water emulsified into TEL |
| 3 | 0.6 | 0.9 | 1.0 | 10.9 | Emulsion not stable |
| 4 | 0.4 | 0.6 | 1.5 | 10.1 | Emulsion not stable |
| 5 | 0.2 | 0.3 | 2.0 | 9.4 | Emulsion not stable |
| 6 | 0.0 | 0.0 | 2.5 | 8.6 | Emulsion not stable |

Each vial was capped, shaken thoroughly by hand, allowed to stand overnight (at least about 16 hours), and observed visually to determine the presence of a stable emulsion. The surfactant or surfactant mixture with the HLB value closest to that of MFAC, e.g., tetraethyllead, yields the most stable emulsion as shown on the right column in Table 2. In the case of tetraethyllead, the HLB value ranges greater than about 11.6 to about 12.4. The above test can be repeated with surfactants having narrower HLB ranges until the HLB value has been determined with greater accuracy.

For purposes of this invention, the HLB of tetraethyllead is considered to be about 12.4. For tests on the removal of MFAC components from contaminated materials, the surfactants in Table 3 were used to confirm the selection by HLB value.

TABLE 3

SURFACTANT DESCRIPTIONS

| Surfactant | Supplier | HLB value | Description |
|---|---|---|---|
| MERPOL HCS (TM) | DuPont Co. | 15.3 | Alcohol ethoxylate |
| TWEEN 21 (TM) | ICI PLC. | 13.3 | 4 EO Sorbitan monolaurate |
| MERPOL OJ (TM) | DuPont Co. | 12.5 | Alcohol ethoxylate |
| AEROSOL AY (TM) | Amer. Cyanamid | (a) | Diamyl ester of sodium sulfosuccinic acid |

TABLE 3-continued

SURFACTANT DESCRIPTIONS

| Surfactant | Supplier | HLB value | Description |
|---|---|---|---|
| IGEPAL CO-430 (TM) | GAF Corp. | 8.8 | Nonylphenoxypolyethoxyethanol |

(a) HLB value not available

Given that tetraethyllead has a HLB of about 12.4, surfactants with HLB values in between about 12.0 to at least about 13.5 are effective in forming a removable MFAC emulsion; with HLB values between 12.0 and 13.0 normally being used. In some cases, surfactant mixtures with the desired HLB value may be obtained by mixing surfactants in proportions such that:

$$(H1 \times f1) + (H2 \times f2) + \ldots + (Hi \times fi) = Hm$$

wherein Hi and fi are the HLB value and weight fraction of the ith surfactant component of the mixture and Hm is the desired mixture HLB value. Mixtures of surfactants having the desired HLB value are, however, usually less beneficial than an individual surfactant of the desired HLB value since fractionation of components of a mixture can occur, e.g., caused by preferential absorption of one surfactant component over another under the conditions of use, thereby effectively altering the HLB value of the surfactant mixture.

Examples of surfactants with HLB values close to 12.5 useful in this invention can comprise or consist essentially of at least one member from the group consisting of CEREX EL 300 (TM, a castor oil ethoxylated with 30 moles of ethylene oxide from Auschem S.p.A.), NP-55-85 (TM, a nonylphenyl ether ethoxylated with 8.5 moles of ethylene oxide from Hefti Ltd., Chemical Products), SYNPERONIC 91/6 (TM, a C9-C11 primary alcohol ethylene oxide condensate from ICI, PLC), SYNTENS KMA 55 (TM, an alkyl ether alcohol ethoxylated with 5.5 moles of ethylene oxide from Hefti Ltd., Chemical Products), MERPOL OJ (TM, a mixture of polyethoxylated aliphatic alcohols from DuPont Co.), or mixtures thereof, among others.

While the concentration of surfactant is not a critical aspect of this invention, normally an aqueous solution containing about 1 to about 4% by weight of surfactant can be used to form a removable MFAC emulsion. For best results, the emulsion has a concentration above the critical micelle concentration (CMC) up to about 4.0% by weight in water. For example, in the case of MERPOL OJ (TM) surfactant, the concentration range is normally between the CMC (0.008%) and 4.0% by weight in water. Below the lower end point of the CMC range, substantially no micelles are present; but rather surfactant molecules dissolved in solution. Without wishing to be bound by any theory or explanation, it is believed that the surfactant surrounds the MFAC thereby forming a mobile or removable micelle.

The volume of aqueous solution that is used for practicing the invention is dependent upon many factors such as the void space of the soil, scale, or sludge, and the volume and contaminated surface area of the equipment to be decontaminated, among others.

After selecting one or more surfactants having an appropriate HLB, the surfactant is used for emulsifying MFAC wherein the emulsified MFAC can be removed. In one aspect of this invention, an aqueous solution of surfactant, e.g., MERPOL OJ (TM) surfactant described above, is brought into contact with MFAC contaminated sludge, soil, equipment, among others. Normally, the aqueous solution is used at ambient temperature, but temperatures of about 0° C. through about 100° C. may be employed. The contact time for the aqueous surfactant solution can vary widely and is dependent upon the method being used for removing the MFAC. For example, the contact time for an in situ removal method will be relatively lengthy in comparison to the contact time for an ex situ method. Usually, the contact time will range from about 1 to about 4 hours for an ex situ treatment but may extend to many days for in situ treatments, e.g., depending upon the accessibility of the contaminants to the surfactant solution and the ease of removal of the contaminants.

The pressures that are used for delivering the aqueous surfactant solution to the contaminated material in "in situ" and "simulated in situ" processes are the pressures sufficient to establish effective contact of the surfactant solution with the contaminated material.

Optionally, a suitable antifoaming agent can be added to the aqueous surfactant solution. While any suitable antifoaming agent can be employed, a mixture comprising or consisting essentially of amorphous silica and polydimethylsiloxane (ANTIFOAM A COMPOUND (TM) from Dow Corning) is effective.

A suitable aqueous surfactant solution is delivered by any effective means to the MFAC contaminated solids, e.g., soil, equipment, among others. After the contaminated solids are contacted with the surfactant solution, a MFAC containing emulsion or "dirty emulsion" is formed that is separated from the treated solids, i.e., now substantially decontaminated solids.

When employing an ex situ or a simulated in situ removal method, the treated solids, e.g., soil and sludge, are separated, e.g., by filtration, from the emulsified MFAC. If necessary, the treated solids may be disposed of by being treated using conventional techniques to recover lead.

The separated aqueous phase or wash fluid containing emulsified MFAC can be processed to remove the emulsified organics, and thereafter the remaining aqueous phase may be discarded. One suitable organic removal process comprises steam distillation, recovery of MFAC and other organic components, and disposal of the remaining aqueous phase or water. In an alternative process, the emulsion may be treated to break the emulsion into a MFAC containing organic phase and an aqueous phase, e.g., the emulsion can be broken by using conventional emulsion-breaking techniques such as pH adjustment, heating, among others. The organic layer or phase can be separated so that the MFAC components are recovered. The remaining aqueous phase can be discharged, or if necessary, can be treated further to remove undesirable materials.

The organic layer or phase described above that contains, for example, TEL, EDC, EDB, among other contaminates, can be blended into a MFAC production system or destroyed by any conventional method such as by incineration.

The steam distilled or stripped water, and any separated aqueous phases will usually contain water soluble alkyllead salts, such as triethyllead salts. These aqueous phases can be treated by using a suitable disposal procedure such as described by Lores and Moore in U.S. Pat. No. 3,770,423; the disclosure of which is hereby incorporated by reference. The disposal procedure of U.S. Pat. No. 3,770,423 comprises adjusting the pH of the aqueous phase to about 9, filtering, and treating the filtrate with sodium borohydride thereby reducing and precipitating alkyllead salts. Other suitable methods known in the art include reduction with zinc, carbon absorption, electrochemical processes, among others. In some cases, it may be desirable to employ one or more of the previously described procedures in order to maximize the quantity of MFAC that is decontaminated and removed from emulsion.

Figure 1:
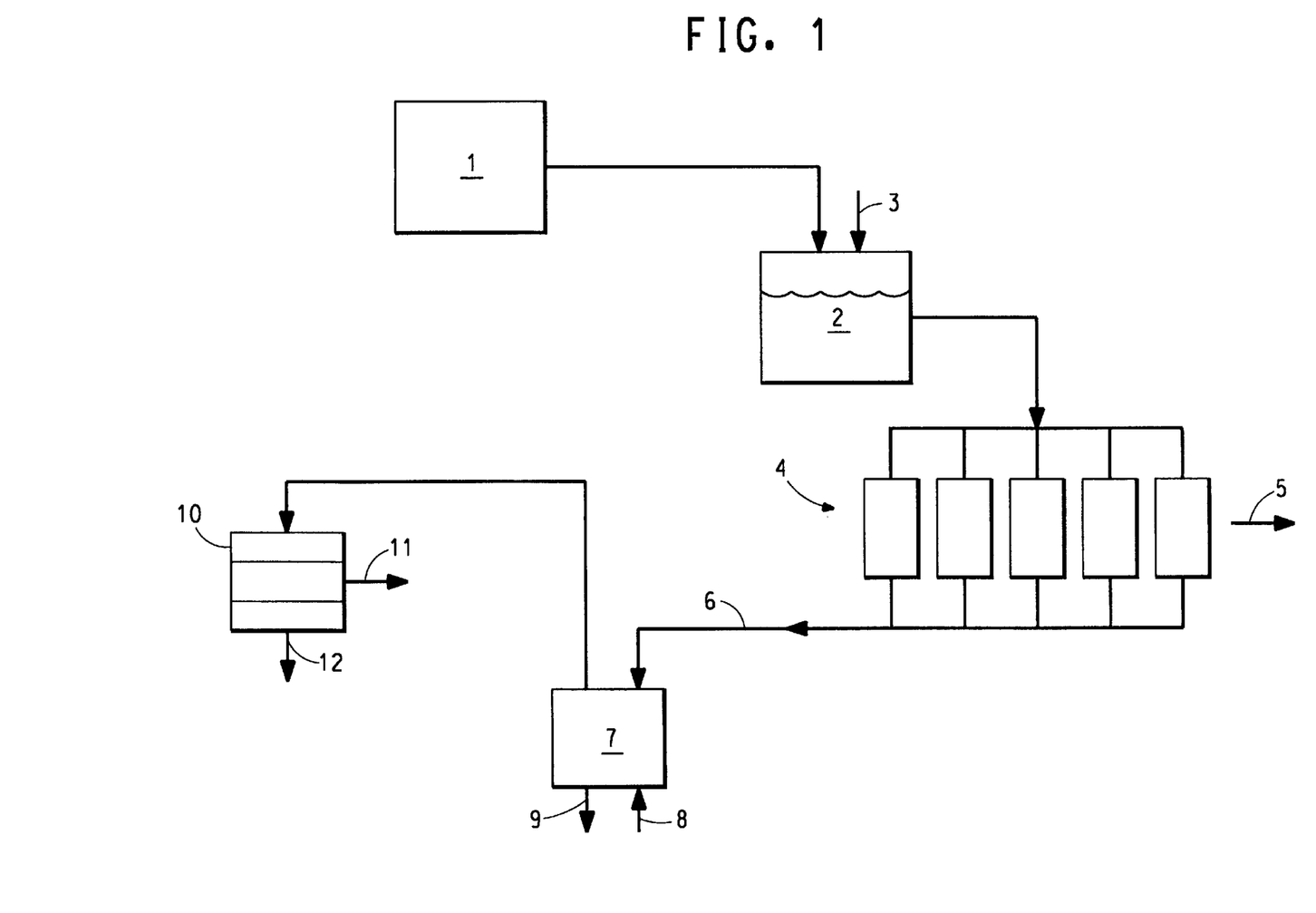
FIG. 1 is a schematic diagram of an ex situ or a simulated in situ process that can be used to practice the invention.
Figure 2:
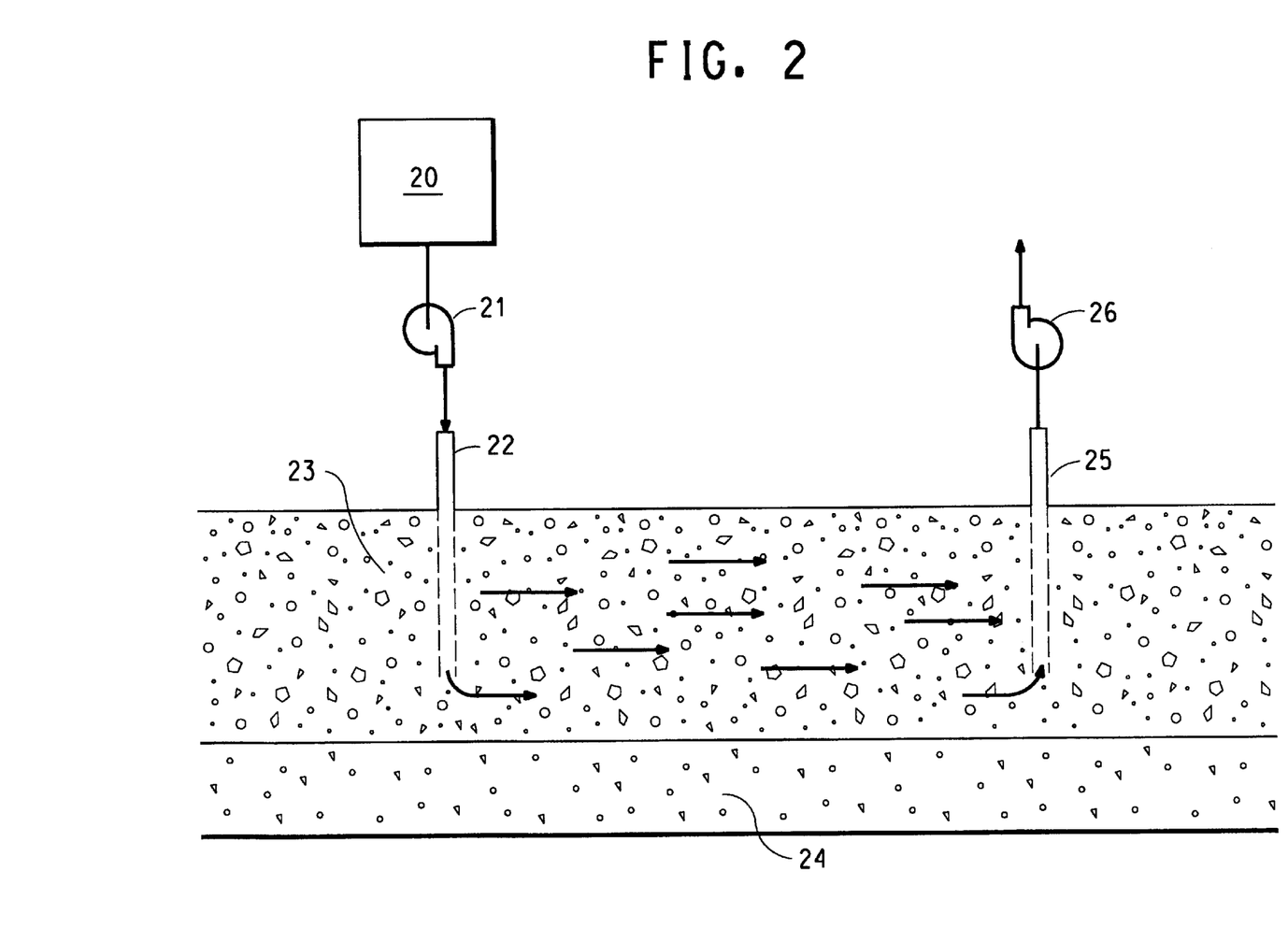
FIG. 2 is a schematic diagram of an in situ process that can be used to practice the invention.

Certain aspects of the invention can be better understood by referring to the drawings. FIGS. 1 and 2 are schematic drawings of processes which can be used to practice the invention.

Referring now to FIG. 1, FIG. 1 illustrates a simulated in situ process or an ex situ process of the invention. A solution comprising or consisting essentially of water, surfactant, and an optional antifoam agent is prepared in container 1. The solution from container 1 is supplied to mixing container 2 for making a MFAC emulsion and to any other location in the process which requires additional quantities of the solution. MFAC contaminated sludge, scale, and/or soil is supplied via conduit 3 to mixing container 2, and mixed with the solution from container 1. A MFAC containing emulsion and treated solids are withdrawn from container 2 and passed through filters 4. While any suitable filter can be used, cotton and polyester bag filters by the KAVON FILTER PRODUCTS CO. (Wall, N.J.) are typically employed.

Treated solids that are substantially free of MFAC are withdrawn from filters 4 via conduit 5. In the event that the treated solids still include unacceptable quantities of MFAC, the solids from conduit 5 can be reintroduced to mixing container 2. A MFAC containing emulsion is withdrawn from the filters 4 and supplied via conduit 6 to, for example, a commercially available steam distillation or stripper 7 in order to separate organics from the emulsion. Steam is supplied to stripper 7 via conduit 8 and separated water is withdrawn via conduit 9. In the event that the water withdrawn from stripper 7 contains unacceptable quantities of lead salts, the water is transported to a conventional lead treatment facility. An aqueous MFAC containing mixture is passed from the stripper and supplied to separation container 10. The MFAC, including other organic substances, form a heavier and water-insoluble phase within the bottom portion of the container 10 and a relatively less dense water phase forms upon the organic phase. The water phase is withdrawn from container 10 and recycled to steam stripper 7 via conduit 11. The organic phase is withdrawn from the bottom of container 10 via conduit 12 and processed further by using conventional techniques, e.g., incineration or production of MFAC.

Referring now to FIG. 2, FIG. 2 illustrates an in situ process of the invention. An aqueous surfactant and an optional antifoam agent is prepared in container 20. The surfactant is transported by pump 21 to injection well 22. Injection well 22 is oriented in a manner sufficient to deliver the surfactant into MFAC contaminated soil 23. In most cases, soil 23 is located above a generally moisture impervious layer 24, e.g., clay. The surfactant travels through soil 23 while forming a MFAC containing emulsion. The surfactant and MFAC containing emulsion are withdrawn from soil 23 from extraction well 25 by pump 26. A more detailed discussion of injection well 22 and extraction well 25 can be found in U.S. patent application Ser. No. 08/060,387, which has been incorporated by reference. If desired the MFAC containing emulsion that has been withdrawn from extraction well 25 can be processed in the manner described above in connection with FIG. 1.

The efficiency of the invention at removing the contaminating MFACs can be determined by comparing the quantity of the organics present in the treated material to the quantity of MFAC in the untreated or original material. For example, a starting soil containing about 3.85% by weight TEL and about 84.2% extracted solids thereby corresponding to an initial TEL/solids ratio of about 4.57% was treated in accordance with the invention by using an ex situ method. After performing the ex situ MFAC removal method, the soil analysis indicated the presence of about 0.112% TEL and 68.8% extracted solids that corresponds to a TEL/solids ratio of approximately 0.16%. As a result, the TEL removal efficiency on a solids basis converts to at least about 96.5%.

While particular emphasis has been placed in the above description upon using a surfactant to emulsify and remove MFAC, the invention can be practiced by using sequential treatments of equivalent or differing surfactants. For example, using sequential surfactant treatments can enhance the removal of a wide range of undesirable compounds. In other cases, it may be desirable to recycle at least a portion of the aqueous surfactant solution, e.g., by delaying removal of the emulsified MFAC and/or reusing the aqueous portion of the surfactant solution. The contact of the contaminated material with the surfactant solution is continued until the necessary level of decontamination is reached, e.g., as shown by analysis of the decontaminated materials and/or analysis of the MFAC-containing emulsion.

The following Examples are provided to illustrate not limit the scope of the invention as defined by the appended claims.

EXAMPLE 1

The Example describes a process for preparing an emulsification of soil adsorbed tetraethyllead (TEL) into water by employing an ex situ treatment.

Garden soil (approximately 25 g net, 84.2% gross solids) was treated with about 1.0 g of pure TEL and allowed to stand for about one hour to effect adsorption. The contaminated soil thus contained approximately 4.57% TEL on a 100% solids basis (3.85% TEL/84.2% solids).

Five commercially available surfactants (see Table 4) in aqueous solution were examined for their efficiency in extracting the TEL from this spiked soil. Water (about 250 ml), or water (about 250 ml) to which had been added 5 g of surfactant, was then added to about 25 g of the treated soil to form a slurry. Ex situ TEL removal was simulated by stirring the slurry of contaminated soil and water with a magnetic stirrer for about four hours at room temperature (20° C.). The slurry was allowed to stand overnight prior to filtration. The mixtures contained well settled soil and fairly clear water layers with the exception of the TWEEN 21 (TM) surfactant mixture in which the water layer was quite milky.

Each mixture was filtered under vacuun, the filter cakes given two equivalent water displacement washes (total volume was about 30 ml), and dewatered under vacuum on a Buchner funnel. The filter cakes were analyzed by gas chromatography of an EDC extract for TEL, and weight % extracted solids. The filtrates were also analyzed for TEL content by using the same EDC extract method. The resultant analytical data is shown in Table 4.

The selection method indicates MERPOL OJ (TM) surfactant (HLB about 12.5) is the most effective of the five surfactants examined under the stated conditions and leaves the soil with the minimum residual contamination and the filtrate with the greatest amount of emulsified TEL. TWEEN 21 (TM, HLB 13.3) and MERPOL HCS (TM) surfactants (HLB 15.3) are progressively less effective. AEROSOL AY (TM) or IGEPAL CO-430 (TM) surfactants (HLB 8.8) are essentially ineffective in this test and are comparable to plain water.

TABLE 4

EX SITU REMOVAL OF ABSORBED TEL FROM SOIL
Isolated Soil (2)

| | | | TEL | | |
|---|---|---|---|---|---|
| Water Surfactant (1) (HLB Value) | Wt. % TEL | Wt. % Extracted Solids | TEL/ Solids (%) (3) | Removal Efficiency (%) | Filtrate Wt. % TEL |
| NONE (control) | 3.16 | 68.4 | 4.62 | 0.0 | <0.02* |
| Aerosol AY (TM) (no HLB value available) | 2.67 | 65.2 | 4.10 | 10.3 | <0.02* |
| Igepal CO-430 (TM) (8.8) | 2.52 | 55.2 | 4.57 | 0.0 | <0.02* |
| Merpol OJ (TM) (12.5) | <0.02* | 81.9 | <0.02 | >99.6 | 0.224 |
| Tween 21 (TM) (13.3) | 0.112 | 68.8 | 0.16 | 96.5 | 0.146 |
| Merpol HCS (TM) (15.3) | 2.30 | 79.7 | 2.89 | 36.8 | 0.025 |

Notes:
(1) All extractions used 2.0 wt. % surfactant based on the water phase, which was 10 times the soil weight.
(2) Soil isolated after 4 hour reslurry at 20° C., equilibrated overnight, and water washed.
(3) Initially soil contained 4.57% TEL based on soil solids (3.85% TEL/ 84.2% solids).
*Lower detection limit is <0.02%.

EXAMPLE 2

This Example demonstrates removing organics from MFAC scale by using a surfactant comprising MERPOL OJ (TM, a polyethoxylated aliphatic alcohol surfactant from DuPont Co.). The concentration of the surfactant varied by test as shown in Table 5. An ex situ process was used.

Filter scale contaminated with MFAC was obtained from bag filters that collected solids from MFAC contaminated equipment. The filter scale comprised about 58% lead as the oxides, bromides, and carbonates, and 27% iron as the oxides contaminated with various levels of TEL and EDB as shown in Table 5, and up to 1% EDC. The rest of the scale consisted of aluminum, silicon, calcium, and bismuth oxides. The filter scale was divided into approximately 25 g samples that were treated with water (about ten times the weight of the sample to be extracted), or water (about ten times the weight of sample to be extracted) to which had been added the amount of MERPOL OJ (TM) surfactant indicated below in Table 5. In each case, the mixture of scale, water, and surfactant were stirred in a flask for a period of about 4 hours while at a temperature of about 25° C., and then remained undisturbed overnight.

The scale was filtered under vacuum by using a Buchner funnel, producing a filter cake. The filter cake was displacement washed with about two cake volumes of water, and analyzed as a 70–80% solids wet cake. Analyses were performed using standard procedures in order to determine the content of TEL (by gas chromatographic analysis of an EDC extract), EDC, EDB (both by gas chromatographic analysis of a xylene extract), and weight % extracted solids.

Data for extractions from several samples of MFAC filter scale are shown in Table 5. Initial concentration levels and the resultant removal efficiencies are shown for each concentration of MERPOL OJ (TM) surfactant.

Tests D–M each used about 25 g quantities of individual bag filter scale samples. The analyses of the starting scale is shown for each series of extraction runs. Each extraction series used an increased concentration of MERPOL OJ (TM) surfactant in the aqueous emulsifying solution.

Tests L and M also incorporated about 0.1 weight % of commercially available ANTIFOAM A COMPOUND (TM, Dow Corning Co.) in the extraction procedure based on the amount of water used. Tests N and O, employed approximately 30 g of MERPOL OJ (TM) surfactant, 1500 ml water, 1.5 g ANTIFOAM A COMPOUND (TM), and a 150 g composite sample of various samples of bag filter scale. Over a period of about one to four hours, the bag scale was slurried in the aqueous surfactant solution, and then the treated scale was filtered by using a Buchner funnel. The results obtained by using MERPOL OJ (TM) surfactant are listed below in Table 5.

TABLE 5

REMOVAL OF VOLATILE ORGANICS FROM MFAC FILTER SCALE(f)

| MERPOL OJ (TM) % | TEL (%) | | EDB (ppm) | | Wt. % Extd. Solids | Removal Efficiency (%) [see (e) for EDC] | |
|---|---|---|---|---|---|---|---|
| | Contamination Levels | | | | | | |
| Test (a) | Initial | Final | Initial | Final | | TEL | EDB |
| D     0 | 13.1 | 6.85 | 18,900 | 2639 | 77.8 | 53.2 | 87.5 |
| E     1 | 13.1 | 4.14 | 18,900 | 1154 | 82.0 | 72.9 | 94.8 |
| F     2 | 13.1 | 0.44 | 18,900 | 207  | 79.6 | 97.3 | 98.9 |
| G     0 | 15.2 | 14.5 | 1,714  | 1064 | 67.5 | 21.5 | 48.9 |
| H     1 | 15.2 | 5.45 | 1,714  | 447  | 73.3 | 72.8 | 80.3 |
| I     2 | 15.2 | 3.00 | 1,714  | 251  | 79.8 | 86.3 | 90.8 |
| J     3 | 15.2 | 1.43 | 1,714  | 421  | 72.3 | 92.8 | 81.2 |
| K     4 | 15.2 | 0.62 | 1,714  | ND(g)| 70.7 | 96.8 | >99.4 |
| L(b)  2 | 15.2 | 2.37 | 1,714  | 354  | 69.3 | 87.5 | 83.5 |
| M(b)  4 | 15.2 | 0.67 | 1,714  | ND(g)| 64.7 | 96.2 | >99.4 |
| N(b,c) 2 | 3.5  | 0.94 | 1,249  | 304  | 66.3 | 72.2 | 74.7 |
| O(b,d) 2 | 3.5  | 0.27 | 1,249  | 372  | 71.2 | 92.6 | 71.4 |

NOTES:

(a) A 10:1 water to filter scale ratio used throughout, MERPOL OJ (TM) surfactant calculated as weight % based on water, with an about 4 hour slurry time at about 25° C., cured for about 16 hours (overnight), and filtered.
(b) Slurry contained about 0.1% ANTIFOAM A COMPOUND (TM).
(c) Approximately 4 hour slurry immediately followed by filtration.
(d) Approximately 1 hour slurry immediately followed by filtration.
(e) Contamination levels of up to about 1% EDC were removed without the aid of a surfactant.
(f) Initial Filter scale weight % extracted solids:
D–F, 69.8%;
G–M, 55.4%;
N–O, 68.5%.
(g) The lowest detectable concentration for EDB by gas chromatographic analysis is 15 ppm.

The results listed in Table 5 indicate that a water reslurry alone is adequate to substantially remove EDC (water solubility=0.88 wt. %); but not TEL (water solubility=0.8 ppm), and only limited amounts of EDB (water solubility= 0.47 wt. %). EDC concentrations up to about 1 weight % in the sludge were removed without the aid of a surfactant. By using water with a surfactant, it is possible to remove TEL, EDB and other organics. The removal efficiency increases with increasing surfactant concentration. An antifoaming agent (ANTIFOAM A COMPOUND, TM) is effective in substantially preventing foam formation in the MERPOL OJ (TM) surfactant-water emulsions. Table 5 also indicates that removal of organics from the bag filter scale with MERPOL OJ (TM) surfactant solution is not adversely effected by the presence of an antifoaming agents.

It is important to note that bag filter scale is a heterogeneous material, which is compositionally dependent upon its source, that may cause variability in the analytical results.

EXAMPLE 3

This Example demonstrates recovering emulsified MFAC components from an ex situ process.

The filtrate formed substantially in accordance with Example 2 was treated by using steam distillation in order to remove organic material. An additional quantity of ANTIFOAM A COMPOUND (TM, about 0.1 weight %) was introduced to the filtrate prior to steam distillation. Steam distillation data for the recovery of the volatile organics removed from the bag scale filtrate is shown below in Table 6. Gas chromatographic analyses of solvent extracts of the initial scale filtrate and of the water phase from the steam distillation of the filtrate were made by the methods described in Example 2. Gas chromatographic analysis of the recovered organic distillate were also made and are shown for the major MFAC components.

TABLE 6

STEAM DISTILLATION FOR RECOVERY OF MFAC ORGANIC COMPOUNDS

| Test | Scale Filtrate Initial Composition (ppm) | | | Steam Stripped Water Concn. (ppm) | | | Recovered Organic Phase from Still Composition (%) (c) | | |
|---|---|---|---|---|---|---|---|---|---|
| (a) | TEL | EDC | EDB | TEL | EDC | EDB | TEL | EDC | EDB |
| B | 3,290 | 161 | 148 | ND | ND | ND | 60.0 | 1.37 | 14.4 |
| C(b) | 2,840 | ND | ND | ND | ND | ND | 64.3 | 1.60 | 12.1 |
| D(b) | 1,290 | ND | ND | ND | ND | ND | 68.8 | 1.67 | 4.5 |

Notes:
a. ANTIFOAM A COMPOUND (TM) added in all steam distillations. Steam distilled at 100 C. for 3 hours.
b. pH adjusted to 9–10 prior to distillation by adding 10% aqueous sodium hydroxide solution.
c. Major components only

EXAMPLE 4

This Example demonstrates removing organics by using a simulated in situ process.

Two samples of garden soil (approximately 50 g) were treated separately with pure TEL (about 2 g) or MFAC (about 2 g). Both treated samples and a sample (approximately 50 g) of MFAC-contaminated filter scale were individually packed by hand into three glass columns that measured about 25 inches in height by 1.25 inches diameter. Each column was eluted with about 520 ml of a solution containing approximately 4% MERPOL OJ (TM) surfactant. Flow through each column was maintained at a rate of about 2 ml./min. After being eluted with the surfactant solution, approximately two 30 ml portions of deionized water were passed through the columns at a rate of about 2 ml/min. The treated solids in the columns were then analyzed by gas chromatographic analysis of solvent extracts for residual TEL and EDB as described in Examples 1 and 2, and also analyzed for weight % extracted solids. The results of the analysis are shown below in Table 7, that lists the initial concentrations of the contaminants and the removal efficiency in each elution process.

TABLE 7

SIMULATED IN SITU REMOVAL OF ORGANICS

| Treated Material | Contamination Levels | | | | Wt. % Ext. Solids | Removal Efficiency (%) [see (a) for EDC] | |
|---|---|---|---|---|---|---|---|
| | TEL (%) | | EDB (ppm) | | | | |
| | Initial | Final | Initial | Final | | TEL | EDB |
| (b) | 3.85 | 0.108 | (e) | — | 63.6 | 96.3 | (e) |
| (c) | 2.37 | 0.108 | 6,900 | ND(f) | 66.2 | 94.3 | >99.8 |
| (d) | 2.62 | 1.00 | 2,220 | 1470 | 30.9 | 12.0 | 25.7 |

NOTES:
a. Because of the water solubility of EDC, EDC contamination up to 1% is removed without the aid of a surfactant.
b. Garden soil treated with pure TEL, initial % extracted solids is about 84.2%.
c. Garden soil treated with MFAC, initial % extracted solids is about 84.2%.
d. MFAC-contaminated filter scale, initial % extracted solids is about 71.2%.
e. Contaminant not added to soil in this test
f. Lower detection limit for EDB analyses is < 15 ppm.

Example 4 demonstrates enhanced TEL removal efficiency for the TEL in garden soil, and improved removal efficiencies for the contaminants in MFAC-spiked garden soil.

Relatively poor removal efficiencies were achieved in connection with the MFAC-contaminated filter scale. Without wishing to be bound by any theory or explanation, it is believed that such efficiencies are caused by the density of filter scale (4.07 g/cc versus 1.03 g/cc for the garden soil), heterogeneity, and hydrophobic nature. The removal efficiency for filter scale can be improved by using an "ex situ" process that employs a relatively vigorous agitation which enhances surface contact.

EXAMPLES 5 AND 6

These Examples demonstrate using a surfactant mixture having HLB values between 12.0 and 13.5 in a ex situ process. In addition, the use of another single surfactant with HLB value of 12.5 (SYNPERONIC 91/6 surfactant (TM)) is illustrated.

The procedure of Example 1 was substantially repeated to emulsify TEL that had been absorbed onto soil (25 g soil spiked with 1 g TEL). The soil was first treated with a surfactant comprising mixture of 60% TWEEN 21 (TM) and 40% TWEEN 85 (TM) surfactant (hereinafter TWEEN 21/85 (TM)). The compositions of the surfactants are described in Table 1 and the mixture had a HLB value of about 12.4. The concentration of TWEEN 21/85 (TM) surfactant mixture used was a 2% aqueous solution by weight. Separately, the soil was treated with SYNPERONIC 91/6 surfactant (TM, composition see prior description) having a HLB value of about 12.5.

The soil and filtrate was analyzed substantially in accordance with the above examples and the results of the analysis are listed in Table 8.

TABLE 8

REMOVAL OF ABSORBED TEL FROM SOIL WITH TWEEN 21 (TM)/TWEEN 85 (TM) SURFACTANT MIXTURE OR SYNPERONIC 91/6 SURFACTANT (TM).

| | Isolated Soil(2) | | | TEL | Water |
|---|---|---|---|---|---|
| Surfactant(1) (HLB Value) | Wt. % TEL | Wt. % Extracted Solids | TEL/ Solids (%)(3) | Removal Efficiency (%) | Filtrate Wt. % TEL |
| Tween 21 (TM)/ Tween 85 (TM)(4) (12.4) | 0.169 | 60.8 | 0.278 | 93.9 | 0.109 |
| Synperonic 91/6 (TM) (12.5)(5) | <0.02* | 72.6 | <0.03 | >99.3 | 0.309 |

Notes:
(1)All extractions used 2.0 wt. % surfactant based on the water phase, which was 10 times the soil weight.
(2)Soil isolated after 4 hour reslurry at 20 C., equilibrated overnight, and water washed.
(3)Initially soil contained 4.57% TEL based on soil solids (3.85% TEL/84.2% solids).
(4)Surfactant mixture is 60% TWEEN 21 (TM) and 40% TWEEN 85 (TM) surfactants by weight.
(5)From ICI, PLC
*Lower detection limit is < 0.02%.

Substantially in accordance with Example 2, filter scale contaminated with MFAC and having a composition of about 2.62 wt. % TEL and 0.222 wt. % EDB and about 71.2% solids was treated. The contaminated scale was emulsified substantially in accordance with the method of Example 2, and was separately extracted with substantially the same TWEEN 21 (TM)/TWEEN 85 (TM) surfactant mixture and SYNPERONIC 91/6 (TM) surfactant described above. The scale and filtrate were analyzed substantially in accordance with previous example. The results of the analysis are listed below in Table 9.

TABLE 9

REMOVAL OF VOLATILE ORGANICS FROM FILTER SCALE WITH TWEEN 21 (TM)/TWEEN 85 (TM) SURFACTANT MIXTURE OR SYNPERONIC 91/6 (TM) SURFACTANT.

| Surfactant(1) | Isolated Filter Scale(2) | | | | | Removal | |
|---|---|---|---|---|---|---|---|
| | Wt. % | | Extracted Wt. % | TEL/ Solids | EDB/ Solids | Efficiency %(4) | |
| (HLB Value) | TEL | EDB | wt. % | (%)(3) | (%)(3) | TEL | EDB |
| Tween 21/85 (TM) (12.4)(5) | 0.258 | ND(7) | 72.0 | 0.358 | <0.002 | 90.3 | >99.4 |
| Synperonic 91/6 (TM) (12.5)(6) | .054 | ND(7) | 76.6 | 0.070 | <0.002 | 98.1 | >99.4 |

Notes:
(1)All extractions used about 4.0 wt. % surfactant based on the water phase, which corresponded to about 10 times the soil weight.
(2)Filter scale isolated after 4 hour slurry at about 20 C., cured overnight, and water washed.
(3)Initially the contaminated filter scale contained about 2.62 wt. % TEL and 0.222 wt. % EDB and had about 71.2% solids (initial % TEL/solids = 3.68, % EDB/solids = 0.311).
(4)Contaminated levels of up to about 1% EDC were removed without the aid of a surfactant due to the relatively high solubility of EDC in water.
(5)Surfactant mixture is approximately 60% TWEEN 21 (TM) and 40% TWEEN 85 (TM) by weight.
(6)From ICI, PLC.
(7)Lower Detection limit for EDB is < 15 ppm.

The results indicate that the single component surfactant is preferred over the surfactant mixture of essentially the same HLB value. SYNPERONIC 91/6 (TM) surfactant is as effective as MERPOL OJ (TM) surfactant.

As was observed for TWEEN 21 (TM) surfactant in Example 1, the water layers from the extractions in which the TWEEN 21/85 (TM) surfactant was used were milky. The water layer from the SYNPERONIC 91/6 (TM) surfactant extractions was clear. The same observations were made when the MFAC filter scale sludge was extracted.

The following is claimed:
1. A method for making an emulsion comprising:
 (a) preparing an aqueous surfactant solution,
 (b) contacting a solid, which contains at least one of a tetraalkyllead and a bromoethane with an amount of the solution that has a hydrophile lipophile balance value and concentration sufficient to form an emulsion comprising at least one of a tetraalkyllead and a bromoethane,
 (c) separating the emulsion from the solids, and,
 (d) recovering the emulsion.
2. The method of claim 1 wherein said contacting comprises applying a shear force to said solid.
3. The method of claim 1 wherein said contacting comprises placing said solid within a defined area and passing the surfactant solution through the defined area.
4. A method for recovering contaminates comprising:
 (a) preparing an aqueous surfactant solution having a hydrophile lipophile balance value that ranges from about 12 to about 13.5,
 (b) contacting an effective amount of the solution with at least one member selected from the group consisting of equipment, soil, sludge, and scale, which have been contaminated with at least one of a tetraalkyllead and a bromoethane for a time and at a temperature sufficient to form an emulsion comprising said contaminants,
 (c) filtering solids from the emulsion,
 (d) recovering solids that are substantially free of said contaminates,
 (e) separating the emulsion into an aqueous phase and an organic phase that contains the contaminants, and,
 (f) recovering the contaminant containing phase.
5. The method of claim 4, wherein said separating comprises steam distillation.
6. The method of claim 5 further comprising incinerating tetraalkyllead and bromoethane.
7. The method of claim 4 wherein said contacting comprises applying a shear force to said member.
8. The method of claim 4 wherein said contacting comprises placing said member within a defined area and passing the surfactant solution through the defined area.
9. The method of claim 1 or 4 wherein the tetraalkyllead or bromoethane comprises at least one member from the group consisting of tetramethyllead, trimethylethyllead, dimethyldiethyllead, methyltriethyllead, tetraethyllead, and 1,2-dibromoethane.
10. An emulsion produced by the method of claim 1 or 4.
11. The emulsion of claim 10 consisting essentially of at least one of tetraalkyllead and bromoethane and about 0.008 up to about 4% by weight surfactant.
12. The method of claim 1 or 4 wherein the contacting comprises in situ.
13. An aqueous emulsion consisting essentially of water, a quantity of at least one of tetraalkyllead that is sufficient to form said emulsion to about 15% by wt %, and about 0.008 to about 4% by wt of a surfactant having an hydrophile lipophile balance value ranging from about 12 to 13.5.

14. The method of claim 1, 2, or 13 wherein the surfactant comprises at least one member from the group consisting of castor oil ethoxylated with about 30 moles of ethylene oxide, a nonylphenyl ether ethoxylated with about 8.5 moles of ethylene oxide, a C9–C11 primary alcohol ethylene oxide condensate, an alkyl ether alcohol ethoxylated with about 5.5 moles of ethylene oxide, and a mixture of polyethoxylated aliphatic alcohols.

* * * * *